Patented Jan. 31, 1933

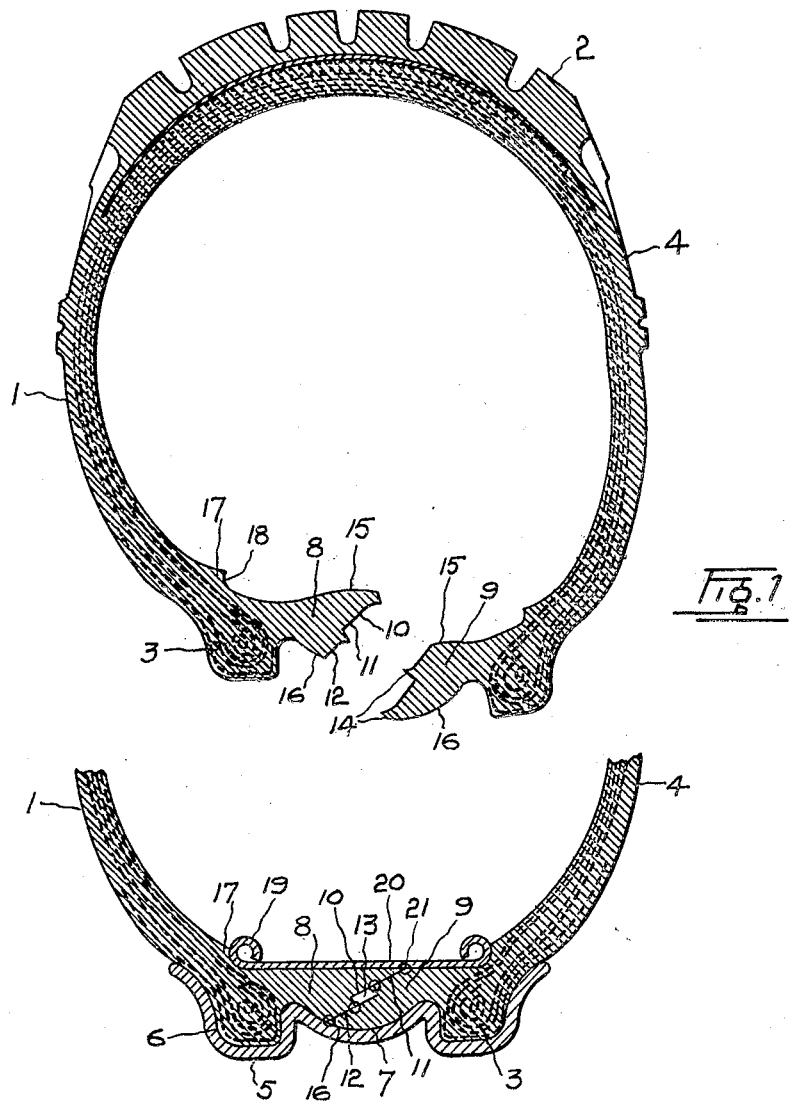

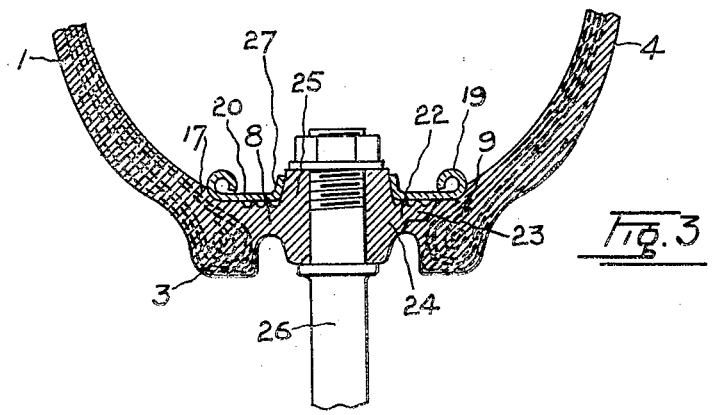
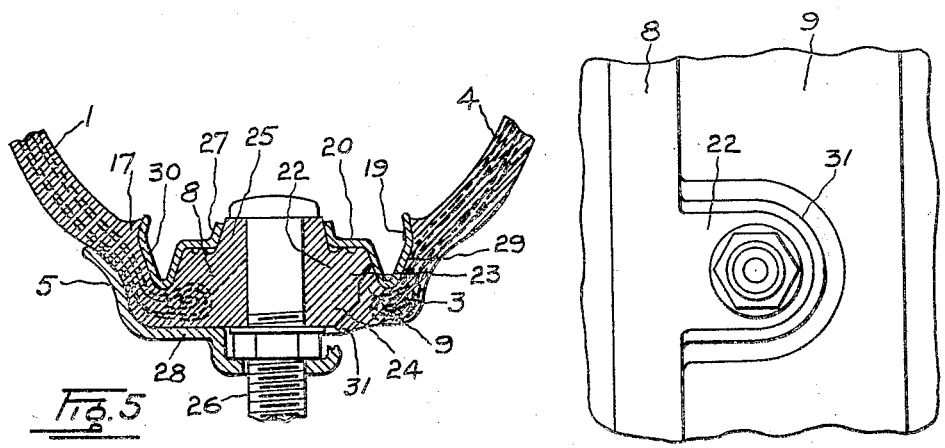
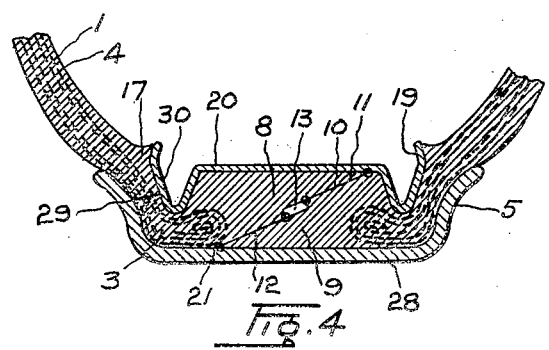

1,895,582

UNITED STATES PATENT OFFICE

FRANK ALLEN MILLICAN, OF VANCOUVER, BRITISH COLUMBIA, CANADA

TUBELESS PNEUMATIC TIRE

Application filed September 14, 1931. Serial No. 562,802.

My invention relates to improvements in tubeless pneumatic tires which are particularly adapted for use for motor vehicles. The objects of the invention are to provide a tire construction which will eliminate the necessity for inner tubes; to provide a tire which can be removed and replaced as easily as an ordinary tire; to provide a tire which can be patched from the inside conveniently so that the internal air pressure tends to hold the patch in place rather than displace it; to obviate the need for expensive bead construction, and to provide a complete tire in which the total weight is less than that of the tire and tube of ordinary construction.

The invention consists essentially of a tire of tubular form adapted to be carried upon a metal rim, the free edges of the tire being so formed as to abut and form an airtight seal when placed upon the rim, and an annular band adapted to be housed within the tire and to engage the free edges of the tire, as will be more fully described in the following specification and shown in the accompanying drawings, in which:—

Fig. 1 is a sectional view of the tire showing the sealing tongues separated.

Fig. 2 is a sectional view of the invention showing the tire mounted upon a rim with the sealing tongues compressed in airtight position.

Fig. 3 is a sectional view showing the sealing tongues adjacent the tire valve.

Fig. 4 is a sectional view of a modified form of the invention as applied to a standard rim.

Fig. 5 is a sectional view showing the sealing tongues adjacent the valve as applied to the modified form of the invention.

Fig. 6 is a plan view of the inner side of the modified form of tire showing the valve.

In the drawings like characters of reference indicate corresponding parts in each figure.

The numeral 1 indicates generally a tire having a tread 2 and beads 3 forming part of a carcass 4. The numeral 5 indicates a rim divided longitudinally into three channels, the outer ones, indicated by the numeral 6, being of a form corresponding to that of the beads 3 and the centre channel, indicated by the numeral 7, being concave in cross section. Extending inwardly from the beads 3 of the tire 1 are two soft rubber flaps or tongues respectively numbered 8 and 9, which are adapted to lie in intimate contact with each other when the tire is in place, these tongues have abutting edges 10 each formed in two planes as at 11 and 12, one offset from the other to define a rebate 13 intermediate the width of the contacting face of each tongue. Along the upper margin of the planes 11 and 12 of the tongue 8 and the lower edges of similar parts of the tongue 9, soft rubber compression ribs 14 extend, which are adapted to be compressed into the face of the rubber facing them when the tire is in place and form an airtight joint.

The upper surface of the combined tongues 8 and 9 is convexed transversely intermediate its width as at 15 and the lower surface of the combined tongues is also convexed as at 16 to conform to the channel 7 of the rim 5.

On the inner side of the tire, adjacent each bead 3, is a soft rubber rib 17, each of which has an inner side 18 curved to a slightly smaller radius than the bead 19 of an endless annular band 20, which band is adapted to be slipped into the tire before the latter is placed upon the rim 5 and to press down the inner convex or crowned portion 15 to present a straight transverse line between the ribs 17 as shown in Figure 2. The band 20 being a complete circle obviously is incapable of circumferential expansion, hence the action of expanding the rim 5 to its normal diameter will compress the rubber tongues 8 and 9 into intimate contact with each other and to bring the compression ribs 14 into forceful contact with the rubber of the tongues opposite them providing longitudinal zones 21 along the joint as indicated in the small circles in Figure 2. The internal air pressure of the tire compresses the inner side 18 of the ribs 17 into intimate contact with the beads 19 of the band 20 so as to form an airtight joint along both edges of said band.

The bead 3 of the tire is greater in cross section than the space between the bead 19 of the band 20 and the free edge of the tire rim 5 and cannot be drawn therethrough, hence the tire bead construction may be less costly than the bead of a tire of ordinary construction which has to be of such strength as to prevent its being stretched or the tire from being blown off the rim. In other words the bead 3 is gripped between two metallic members, the band 20 and the rim 5 and held against displacement in any direction, whereas in tires of ordinary construction the bead is held against transverse displacement by the rim.

The contour of the tongues 8 and 9 is changed at that portion of the tire where the valve is placed. The portion 8 is provided with a lateral protuberance 22 which is substantially semi-circular and is in the form of two inverted half cones 23 and 24 of different base diameters, which seat in complementary depressions formed in the tongue 9. The upper face of the protuberance 22 is provided with a conical boss 25 through which the stem 26 of the valve extends. At this point an aperture is formed in the band 20 and its marginal edges are upturned to a similar angle as at 27 to that of the boss 25 so that the seating of the band in position upon the tongues 8 and 9 will form an airtight joint therebetween.

In the modification shown in Figures 4, 5 and 6, a standard collapsible or other standard rim 28 is used which enables a greater amount of soft rubber to be used in constructing the tongues 8 and 9 and a longitudinal V-groove 29 is formed at the intersection of the tongue and the side wall of the tire. The internal band 20 differs also from that previously described in so far as it is provided with spaced V-ribs 30 on opposite edges which bed into the groove 29 and compress the beads 3 between the ribs and the free edges of the rim 5 and compress the soft rubber of the upper portion of the tongues laterally inwards to increase the sealing capacity of the joint therebetween. The protuberance 22 surrounding the valve is substantially similar to that above described, but a semi-circular rib 31 is formed upon the complementary portion of the tongue 9 which is adapted to be compressed to the plane of the normal inner face of the tongues 8 and 9 when the tire is fitted upon the rim, so as to increase the sealing effect of the joint of the tongues about the valve.

What I claim as my invention is:

1. A tubeless tire adapted for mounting upon a one piece collapsible rim, said tire comprising a tread, side walls and an inner and an outer annular tongue extending transversely inwards from the side walls and being substantially triangular in cross section with the upper angle of one tongue adapted to lie in contact with the lower angle of the other tongue, an annular band surrounding and in contact with the inner tongue and having a diameter somewhat less than the upper face of the inner tongue whereby the upper coacts with the annular band to compress the tongues into sealing contact with each other, said annular band having a pair of inwardly directed marginal beads adapted to extend below the edges of the side portions of the rim to prevent the withdrawal of the tongues from the rim.

2. The combination with a one piece collapsible rim, of a tubeless tire comprising a tread, side walls and an inner and outer annular tongue extending transversely from the side walls in overlapping relation with each other, an annular band surrounding and in contact with the inner periphery of the inner tongue and having a lesser diameter than said inner periphery, said tire being adapted to be fitted upon the rim prior to the expanding of said rim, and said tongues to be pressed into sealing contact with each other between the annular band and the rim as the said rim is expanded, said tire having a groove between each side wall and its tongue and said annular band having internally directed beads adapted to lie in said grooves and to extend below the free edges of the side portions of the rim.

Dated at Vancouver, B. C., this 2nd day of September, 1931.

FRANK ALLEN MILLICAN.